US008936381B2

(12) United States Patent
Luger et al.

(10) Patent No.: US 8,936,381 B2
(45) Date of Patent: Jan. 20, 2015

(54) LED LIGHT MODULE

(75) Inventors: Andreas Luger, Kilb (AT); Andreas Moser, Haag (AT)

(73) Assignee: Zizala Lichtsysteme GmbH (AT)

( * ) Notice: Subject to any disclaimer, the term of this patent is extended or adjusted under 35 U.S.C. 154(b) by 630 days.

(21) Appl. No.: 13/106,325

(22) Filed: May 12, 2011

(65) Prior Publication Data

US 2011/0280031 A1 Nov. 17, 2011

(30) Foreign Application Priority Data

May 12, 2010 (EP) .................................... 10450085

(51) Int. Cl.
*B60Q 1/00* (2006.01)
*F21S 8/10* (2006.01)

(52) U.S. Cl.
CPC ......... *F21S 48/1154* (2013.01); *F21S 48/1225* (2013.01); *F21S 48/1747* (2013.01)
USPC ............ 362/538; 362/543; 362/544; 362/545

(58) Field of Classification Search
USPC ................................................. 362/459–549
See application file for complete search history.

(56) References Cited

U.S. PATENT DOCUMENTS

| | | | | |
|---|---|---|---|---|
| 7,736,035 | B2 * | 6/2010 | Chinniah et al. | 362/507 |
| 2002/0053878 | A1 | 5/2002 | Masaki | |
| 2004/0208018 | A1 * | 10/2004 | Sayers et al. | 362/545 |
| 2008/0049438 | A1 * | 2/2008 | Bloemen et al. | 362/545 |
| 2011/0038172 | A1 * | 2/2011 | Vollmer et al. | 362/543 |
| 2011/0169410 | A1 * | 7/2011 | Dassanayake et al. | 362/543 |

FOREIGN PATENT DOCUMENTS

| | | | |
|---|---|---|---|
| DE | 819791 | C | 11/1951 |
| DE | 918433 | C | 9/1954 |
| DE | 19822846 | A | 12/1999 |
| EP | 2020565 | A | 2/2009 |

* cited by examiner

*Primary Examiner* — William Carter
(74) *Attorney, Agent, or Firm* — Design IP

(57) ABSTRACT

The invention relates to an LED light module for a motor vehicle, or for a headlight for a motor vehicle, wherein the light module comprises a lens and an LED light source, wherein according to the invention a diffusion disk is disposed between the LED light source and the lens as viewed in the light exit direction, wherein the diffusion disk has at least one aperture for the direct passage of at least one component of the light emitted by the LED light source, and wherein the direct component of the light emitted by the LED light source, which component emerges through the aperture of the diffusion disk, is projected through the lens so as to generate a lighting function in the region in front of the motor vehicle.

19 Claims, 2 Drawing Sheets

LED LIGHT MODULE

BACKGROUND OF THE INVENTION

The invention relates to an LED light module for a motor vehicle or for a headlight for a motor vehicle, wherein the light module comprises a lens and an LED light source.

An LED light source of this type can be constructed out of multiple light-emitting diodes (LEDs) that are arranged so as to create “one” common light bundle.

A light module such as that mentioned above is essentially composed of one (or more) LED light source(s), e.g., in the form of a high-power light-emitting diode and a lens, can be used to generate a distribution of light that contains light components over the HD line in the generated light pattern. The lighting function thus implemented (example: high beam, object illumination, . . . ) can only be activated in special driving situations, specifically whenever an object to be illuminated is present in front of the vehicle, or the situation allows the high beam to be turned on.

As a result, a light module of this type is active only very rarely, often only for a few minutes per hour depending on the type (high beam, object illumination, . . . ). A light module of this type can thus not be incorporated into creating the night design for the vehicle or of the vehicle headlight; i.e., the region of the light module that is outwardly visible appears dark at night whenever the light module has not been activated, and this is often perceived to be unattractive.

Due to the design of the light module that is required to implement the lighting function (high maximum illuminance, e.g., approximately 150 lux) and the correspondingly limited possibility of reducing the LED light output, it is also not possible to operate the lighting function in the dimmed state without exceeding the legally specified values for stray light.

The object of this invention is therefore to provide a solution to the above-mentioned problem.

This object is achieved by a light module as mentioned above, whereby a diffusion disk is disposed according to the invention between the LED light source and the lens of the diffusion disk as viewed in the light exit direction, wherein the diffusion disk has at least one aperture for the direct passage of at least one component of the light emitted from the LED light source, and wherein the direct component of the light emitted by the LED light source and exiting through the aperture of the diffusion disk is projected through the lens so as to generate a lighting function in the region in front of the motor vehicle.

The lens is able to be fully illuminated homogeneously due to the diffusion disk’s being provided, where the light from the primary light source is able to pass unobstructed through the aperture in the diffusion disk, with the result that the main lighting function is unaffected.

This approach enables the light module to be integrated into the headlamp design even with a non-activated lighting function, whereby the diffusion disk is illuminated and the light module accordingly is visually perceptible and does not appear dark.

In a specific embodiment of the LED light module according to the invention, provision is made whereby the LED light source is provided as the primary light source, where essentially the entire emitted relevant luminous flux of this light source emerges through the aperture in the diffusion disk to generate the lighting function.

The term “relevant” luminous flux is understood to refer to that luminous flux that can enter through the light entrance surface of the lens into this lens; this luminous flux thus comprises those light rays that are emitted by the LED light source within the aperture angle of the lens. A light-emitting diode has a given emission behavior depending on the design, with the result that typically a fraction of the light rays—assuming this is not deflected—is emitted in directions at angles that are greater than the aperture angle of the lens, such that this light does not pass into the lens and is thus in principle usable for the lighting function. Light from the LED light source that is emitted at an angle greater than the aperture angle no longer constitutes “relevant” luminous flux.

In an especially advantageous embodiment of the invention, at least one additional LED light source is provided as a secondary light source that is disposed relative to the aperture of the diffusion disk in such a way that the light emitted by the secondary light source is essentially emitted onto the diffusion disk so that essentially no luminous flux from the secondary light source emerges through the aperture of the diffusion disk.

An LED light source of this type can be constructed from one or more light-emitting diodes (LED) that form a “common” light beam. The secondary light source can then be constructed from one or more of these LED light sources—see also below.

A diffusion disk (diffuse disk) that is illuminated by one or more additional LED light sources is used to generate a homogeneously illuminating surface.

Provision can be made here whereby one axis through the LED light source of the primary light source and the aperture of the diffusion disk form the optical axis, and whereby the at least one LED light source of the secondary light source lies outside the optical axis.

This approach in simple fashion prevents the light from the secondary light source from exiting through the aperture of the diffusion disk and thereby causing unwanted interfering radiation.

In order to achieve the optimum, most-homogeneous-possible full illumination of the diffusion disk, or the most homogeneous appearance of the diffusion disk and thus of the light module, provision can be made whereby the at least one LED light source of the secondary light source is displaced to the rear relative to the primary light source and opposite to the exit direction of the light.

A more homogeneous illumination of the diffusion disk is achieved as the distance of the LED light source(s) from the secondary light source increases.

In another embodiment of the invention, provision is made whereby the secondary light source comprises two or more LED light sources for the purpose of obtaining a homogenous full illumination of the diffusion disk.

Another advantageous aspect is that the LED light source of the primary light source and the at least one LED light source of the secondary light source are controllable separately, thereby allowing the primary light source and the secondary light source to be turned on and off independently of each other.

It is furthermore advantageous—when the light module is installed in a vehicle headlight—if the secondary light source of the light module has n LED light sources in the vertical direction below a horizontal plane, which runs, for example, through the LED light source of the primary light source, and has m LED light sources above the horizontal plane, where $m<n$.

Since the lens of the light module is generally observed from viewing angles above this horizontal plane, it is advantageous for the number of LEDs to be increased in the lower region since this region is projected into the angular region above the horizontal, and as a result a visually more attractive illumination of the lens is able to be achieved.

Just as it is true that the optical axis of the lens does not necessarily have to run through the LED, or through its geometric center in the case of multiple LEDs, the horizontal plane also does not necessarily have to run through the primary LED light source, but instead can be defined by the lens that is displaced vertically, as the result of which the position of the projection (viewing angle) also changes.

In principle, the optimum approach would be a larger number of LED light sources for the secondary light source—however, this would be limited by cost and by the available installation space for the headlight. In a simple, cost-effective variant of the invention by which attractive results can be achieved in fully illuminating the lens/diffusion disk, m=0.

It is furthermore more advantageous in terms of the most uniform possible illumination, if the LED light source(s) above or below the horizontal plane is/are in each case disposed symmetrically in the horizontal direction relative to a vertical plane through the optical axis.

Provision can also be made in this regard whereby additional LED light sources of the secondary light source are disposed laterally adjacent to the LED light source of the primary light source.

In order to be able to optimally utilize the luminous flux from the LED light source of the primary light source, provision is furthermore made whereby the dimensions of the aperture in the diffusion disk—such as, for example, diameter, lateral dimensions, etc., and/or the arrangement of the LED light source of the primary light source relative to the aperture of the diffusion disk, and/or the distance of the LED light source of the primary light source from the diffusion disk—are selected in such a way that coming from the LED light source forming the primary light source all of the emitted light rays that lie within an aperture angle of the lens can pass through the aperture.

The size of the aperture in the diffusion disk is dependent on the distance of the disk from the LED light source of the primary light source and can be derived from the aperture angle of the lens. Since the aperture of the diffusion disk is projected directly through the lens, it is advantageous to implement this aperture to be as small as possible. In addition, the shape of the aperture is preferably matched to the shape of the trimmed lens.

The diffusion disk is positioned as close as possible to the LED light source of the primary light source so as to minimize the size of the aperture.

In terms of the shape of the trimmed lens, it is especially important what shape the light entrance surface of the lens has. The lens here has a flat or curved surface with, for example, a circular (square, rectangular) shape, or any shape based on the application, the shape here being identified as the "shape of the trimmed lens." Proportionally, the shape of the aperture here is preferably identical to the trimmed lens.

The shape of the diffusion disk is preferably implemented so that it is visible through the projection lens, as seen from outside, from all viewing angles, thereby allowing an effectively homogeneous appearance to be created for the lens.

It is furthermore advantageous if the dimensions of the aperture in the diffusion disk—such as, for example, diameter, lateral dimensions, etc., and/or the arrangement of the at least one LED light source of the secondary light source relative to the aperture of the diffusion disk, and/or the distance of the at least one LED light source of the secondary light source from the diffusion disk—are selected such that light rays are emitted by the at least one LED light source forming the secondary light source only into regions of the diffusion disk that have no aperture.

In this way, no passage of secondary light through the aperture of the diffusion disk can occur, which occurrence would cause unwanted effects.

It is in particular advantageous if the dimensions of the aperture in the diffusion disk—such as, for example, diameter, lateral dimensions, etc., and/or the arrangement of the at least one LED light source of the secondary light source relative to the aperture of the diffusion disk, and/or the distance of the at least one LED light source of the secondary light source from the diffusion disk—are selected such that light rays are emitted by the at least one LED light source forming the secondary light source up to the edge of the aperture of the diffusion disk.

The uniform illumination of the diffusion disk is essentially defined by 3 parameters: distance from the secondary LED light source(s) from the diffusion disk, number of light sources, and arrangement of the light source about the optical axis of the lens, preferably on one or more planes behind the disk, so as to achieve the necessary distance of the secondary LED light sources from the diffusion disk.

The general rule is that the homogeneity of the lens is directly proportional to the number of secondary LED light sources and the distance of the secondary LED light sources from the diffusion disk, a uniform distribution of the secondary LED light source being advantageous.

The installation space available for the light module has a limiting effect on these parameters. On this basis, certain optimized variants are found.

Provision can furthermore be made whereby the edge of the aperture of the diffusion disk tapers down in the direction of the primary light source, e.g., is trapezoidal so as to be optimally matched to the optical path of the marginal rays from the primary light source (marginal rays are those light rays that strike the lens below the aperture angle of the lens).

In terms of the LED light source of the primary light source, this can, for example, be an infrared light source.

SUMMARY OF THE INVENTION

In one respect, the present invention comprises an LED light module for a vehicle headlight, the LED light module comprising a lens, an LED light source that emits light, and a diffusion disk disposed between the LED light source and the lens as viewed in a light exit direction, the diffusion disk having at least one aperture for the direct passage of at least one component of the light emitted by the LED light source, and wherein a direct component of the light emitted by the LED light source emerges through the aperture and is projected through the lens so as to generate a lighting function in a region in front of the vehicle headlight.

BRIEF DESCRIPTION OF THE DRAWINGS

The present invention will hereinafter be described in conjunction with the appended drawing figures wherein like numerals denote like elements.

DETAILED DESCRIPTION OF THE PREFERRED EMBODIMENTS

Figure 1:
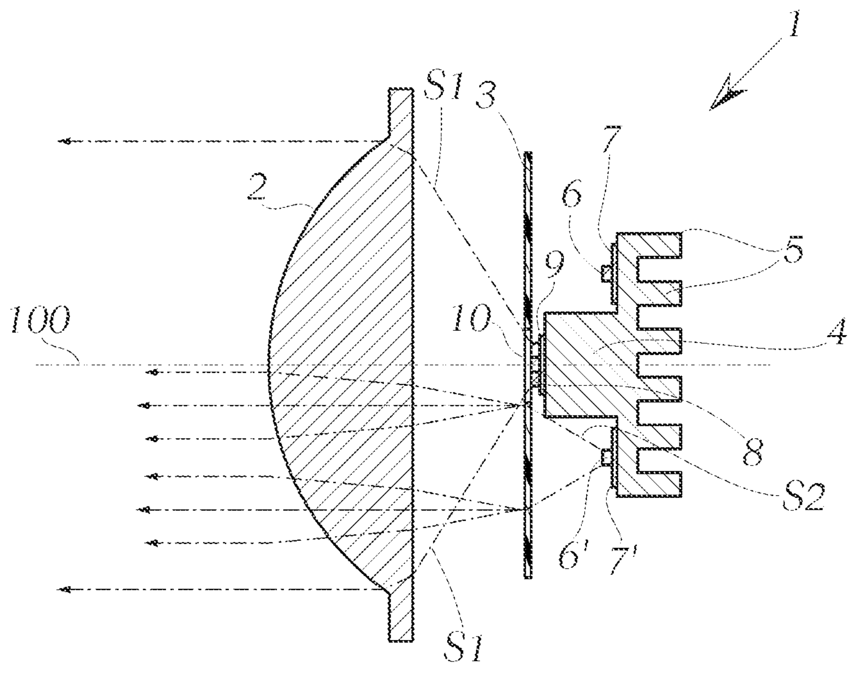
FIG. 1 illustrates a light module according to the invention in a vertical section along the optical axis of the module.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

To aid in describing the invention, directional terms are used in the specification and claims to describe portions of the present invention (e.g., upper, lower, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

Figure 2:
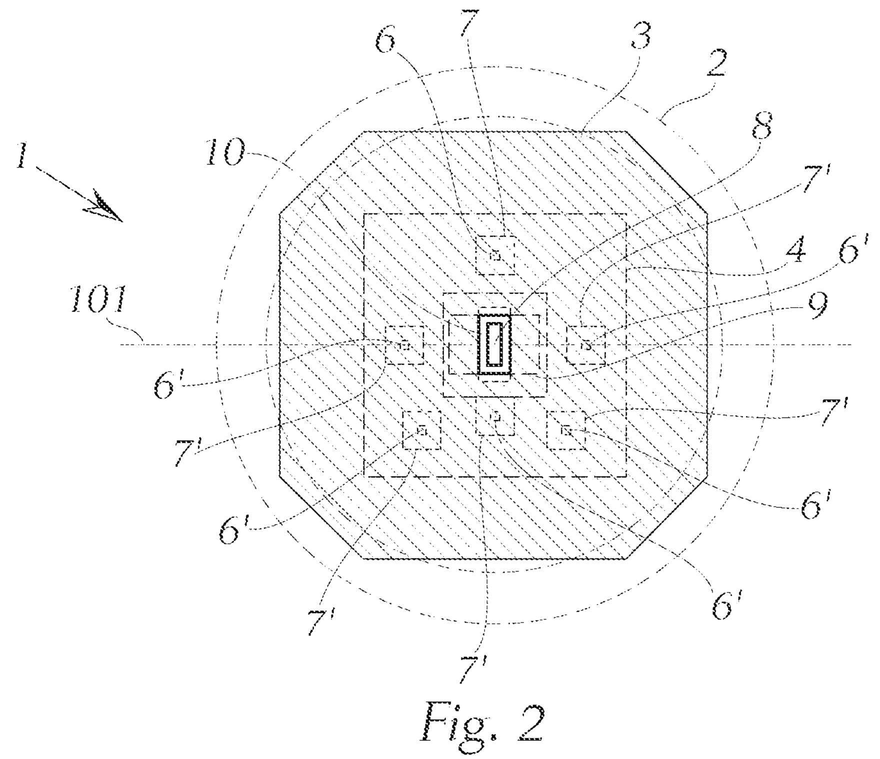
FIG. 2 is a schematic front view a first variant of the light module.

FIGS. 1 and 2 illustrate a first light module 1 according to the invention for a motor vehicle or for a headlight for a motor vehicle. The LED light module 1 comprises a lens 2 and an LED light source 8, 9, where this LED light source is composed of a print 8 and a light-emitting diode 9. This LED light source can be a high-power light-emitting diode; or it can also be an infrared light-emitting diode.

A diffusion disk 3 is disposed between this LED light source 8, 9, and lens 2, where diffusion disk 3 has an aperture 10 allowing direct passage of at least one component of the light emitted by LED light source 8, 9. This direct component of LED light source 8, 9, which component emerges through aperture 10 of diffusion disk 3, is projected through lens 2 to generate a lighting function in the region in front of the motor vehicle.

LED light source 8, 9 is provided as the primary light source, where essentially the entire emitted relevant luminous flux of this light source emerges through aperture 10 of diffusion disk 3 to generate the lighting function. The lighting function here relates, e.g., to a high beam or an object illumination (e.g., pedestrian), which lighting function is activated appropriately only in special driving situations.

The term "relevant" luminous flux is understood to refer to that luminous flux that can enter through the light entrance surface of the lens into this lens; this luminous flux thus comprises those light rays that are emitted by the LED light source within the aperture angle of the lens. A light-emitting diode has a given emission behavior depending on the design, with the result that typically a fraction of the light rays—assuming this is not deflected—is emitted in directions at angles that are greater than the aperture angle of the lens, such that this light does not pass into the lens and is thus in principle usable for the lighting function. Light from the LED light source that is emitted at an angle greater than the aperture angle no longer constitutes "relevant" luminous flux.

Furthermore, additional LED light sources 6, 7; 6', 7' (the reference numerals 6, 6' identify the given light-emitting diode; reference numerals 7, 7' identify the associated LED prints) are provided that together form a secondary light source which is disposed relative to aperture 10 of diffusion disk 3 in such a way the light emitted by the secondary light source is essentially emitted onto diffusion disk 3, so that essentially no luminous flux, preferably absolutely no such flux, from the secondary light source emerges through aperture 10 of diffusion disk 3.

Diffusion disk 3 can be illuminated by these additional LED light sources, through which diffusion disk the lens can be fully illuminated, homogeneously, where the light from the primary light source is able to pass unobstructed through the aperture in the diffusion disk such that the main lighting function is not affected.

This approach enables the light module to be integrated into the headlamp design even with a non-activated lighting function, whereby the diffusion disk is illuminated and appropriately, during darkness, for example, the light module is visually perceptible and does not appear dark.

Based on the design of the light module that is required to implement the lighting function (high maximum illuminances, e.g., around 150 lux) and the corresponding limited possibility of reducing the LED light output, it is also not possible to operate the lighting function in the dimmed state without thereby exceeding the legally specified values for stray light.

Both LED light source 8, 9 of the primary light source as well as LED light sources 6, 7; 6', 7' of the secondary light source are mounted on a heat sink 4 having cooling fins 5. The specific form of the heat sink is described in more detail below.

As is revealed in FIG. 1, one axis through LED light source 8, 9 of the primary light source and through aperture 10 of diffusion disk 3 forms the optical axis 100. Additional LED light sources 6, 7; 6', 7' of the secondary light source lie outside optical axis 100.

This approach in simple fashion prevents the light from the secondary light source from exiting through the aperture of the diffusion disk and thereby causing unwanted interfering radiation.

In order to achieve the optimum, most-homogeneous-possible full illumination of the diffusion disk, or the most homogeneous appearance for the diffusion disk and thus of the light module, provision is also made whereby LED light sources 6, 7; 6', 7' of the secondary light source are displaced to the rear relative to primary light source 8, 9 and opposite to the exit direction of the light. A more homogeneous full illumination of the diffusion disk is achieved as the distance of the LED light source(s) from the secondary light source increases.

Similarly, heat sink 4 has a front plane, on which primary light source 8, 9 is mounted, and has another set-back plane for secondary light sources 6, 7; 6', 7'. Only one such plane is provided for the secondary light sources in the variant illustrated, but two or more of such planes can in principle also be provided.

A kind of dome protrudes from the plane for the secondary LED light sources, the plane for the primary LED light source being located on the dome. This dome of course also affects the light emitted by the secondary LED light sources, as will be discussed below.

LED light source 8, 9 of the primary light source and the LED light sources 6, 7; 6', 7' of the secondary light source are controllable separately, thereby enabling the primary light source and the secondary light source to be turned on and off independently of each other.

When the light module is in the installed state in a vehicle headlight, the secondary light source of the light module has n LED light sources 6', 7' vertically below a horizontal plane 101 through the LED light source of the primary light source, and m LED light sources 6, 7 above the horizontal plane, where $m<n$.

This is evident in FIG. 2, where n=3 and m=1, and also in FIG. 2, where m=0 and n=3.

The LED light source(s) above or below horizontal plane 101 is/are each arranged symmetrically in the horizontal direction relative to a vertical plane through optical axis 100.

Figure 3:
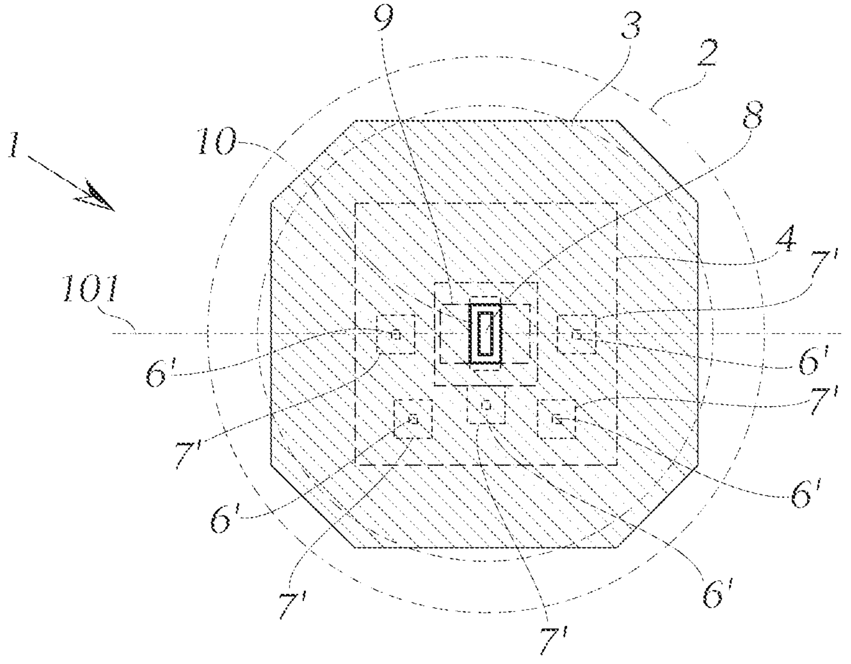
FIG. 3 is a schematic front view of another variant of the light module according to the invention.

Furthermore, additional LED light sources 6', 7' of the secondary light source are also arranged laterally adjacent to LED light source 8, 9 of the primary light source—that is, one on each side in the specific example in FIG. 2 or FIG. 3.

In order to be able to optimally utilize the luminous flux from LED light source 8, 9 of the primary light source, provision is furthermore made whereby the dimensions of aperture 10 in diffusion disk 3—such as, for example, diameter, lateral dimensions, etc., and/or the distance of LED light source 8, 9 of the primary light source from the diffusion disk 3—are selected in such a way that coming from LED light source 8, 9 forming the primary light source all of the emitted light rays that lie within an aperture angle of lens 2 can pass through aperture 10. The rays emitted by the primary LED light source that just reach the aperture angle of the lens—in other words, are just barely allowed by aperture 10 to pass through—are identified by S1 (FIG. 1).

The size of the aperture in the diffusion disk is dependent on the distance of the disk from the LED light source of the primary light source and can be derived from the aperture angle of the lens. Since the aperture of the diffusion disk is projected directly through the lens, it is advantageous to implement this aperture to be as small as possible. In addition, the shape of the aperture is preferably matched to the shape of the trimmed lens.

The diffusion disk is positioned as close as possible to the LED light source of the primary light source so as to minimize the size of the aperture.

The shape of the diffusion disk is preferably implemented so that it is visible through the projection lens as seen from outside from all viewing angles, thereby allowing an effectively homogeneous appearance to be created for the lens.

Provision is furthermore made whereby the dimensions of aperture 10 in diffusion disk 3—such as, for example, diameter, lateral dimensions, etc., and/or the arrangement of LED light sources 6, 7; 6', 7' of the secondary light source relative to aperture 10 of diffusion disk 3, and/or the distance of LED light sources 6, 7; 6', 7' of the secondary light source from diffusion disk 3—are selected such that light rays are emitted by LED light sources 6, 7; 6', 7' forming the secondary light source only into regions of diffusion disk 3 that have no aperture 10.

In this way, no passage of secondary light through the aperture of the diffusion disk can occur, which occurrence would cause unwanted effects.

As FIG. 1 illustrates, it is in particular advantageous if the dimensions of aperture 10 in diffusion disk 3—such as, for example, diameter, lateral dimensions, etc., and/or the arrangement of LED light sources 6, 7; 6', 7' of the secondary light source relative to aperture 10 in diffusion disk 3, and/or the distance of LED light sources 6, 7; 6', 7' of the secondary light source from diffusion disk 3—are selected such that light rays are emitted by LED light sources 6, 7; 6', 7' forming the secondary light source up to the edge of aperture 10 of diffusion disk 3.

In this regard, FIG. 1 shows those rays S2 from secondary LED light sources 6, 7; 6', 7' that just reach the edge of aperture 10; rays that are emitted at an even greater angle and could emerge through aperture 10 are already absorbed or (diffusely) reflected by the heat sink, i.e., by the dome on which the primary light source sits, depending on the surface properties of the heat sink or of its dome.

The distance of the secondary LED light sources from the dome of the heat sink 4 must be in direct proportion to the distance of the secondary LED light sources from the diffusion disk, since otherwise excessive shading effects would be created by the dome. Slight shading by the dome can be compensated by the light-guide effect in the diffusion disk.

The adjustment as to how secondary LED light sources 6, 7; 6', 7' are to be arranged on the heat sink so as to achieve the maximum and uniform full illumination of diffusion disk 3 without having any light pass through aperture 10 is of course also dependent on the geometry of heat sink 4.

The uniform illumination of the diffusion disk is essentially defined by 3 parameters: the distance of the LED light source(s) from the diffusion disk, the number of light sources and arrangement of the light source around the optical axis of the lens, preferably in one or more planes behind the disk so as to achieve the requisite distance of the secondary LED light sources from the diffusion disk.

The general rule is that the homogeneity of the lens is directly proportional to the number of LED light sources and the distance of the secondary LED light sources from the diffusion disk, a uniform distribution of the secondary LED light sources being advantageous.

The installation space available for the light module has a limiting effect on these parameters. On this basis, certain optimized variants are found, such as, for example, the stepped arrangement of the LED light sources in FIG. 1.

The secondary LED light sources could also be positioned in one plane with the primary LED light source. This approach also enables a homogeneous luminous impression to be implemented even with a small number of LEDs. In this case, however, the diffusion disk should be curved forward or run obliquely forward.

While the principles of the invention have been described above in connection with preferred embodiments, it is to be clearly understood that this description is made only by way of example and not as a limitation of the scope of the invention.

The invention claimed is:

1. An LED light module for a vehicle headlight, the LED light module comprising:
- a projection lens;
- an LED light source that emits light; and
- a diffusion disk disposed between the LED light source and the projection lens as viewed in a light exit direction, the diffusion disk having at least one unaltering aperture for direct passage of at least one component of the light emitted by the LED light source;
- wherein a direct component of the light emitted by the LED light source emerges through the unaltering aperture and is projected through the projection lens so as to generate a lighting function in a region in front of the vehicle headlight; characterized in that the LED light source is a primary light source, the LED light module further including at least one additional LED light source as a secondary light source having emitted light rays and an emitted luminous flux, the secondary light source being arranged relative to the unaltering aperture in such a way that the emitted light rays of the secondary light source are emitted essentially onto the diffusion disk so that essentially no luminous flux from the secondary light source emerges through the unaltering aperture.

2. The LED light module of claim 1, characterized in that the LED light source is a primary light source having an emitted relevant luminous flux, wherein essentially the entire emitted relevant luminous flux of the primary light source emerges through the unaltering aperture so as to generate the lighting function.

3. The LED light module of claim 1, characterized in that an axis running through the LED light source of the primary light source and the unaltering aperture forms an optical axis, wherein the at least one additional LED light source of the secondary light source does not lie along the optical axis.

4. The LED light module of claim 1, characterized in that the LED light module has a rear side opposing the projection lens, wherein the at least one additional LED light source of the secondary light source is displaced towards the rear side relative to the primary light source.

5. The LED light module of claim 1, characterized in that the secondary light source comprises two or more LED light sources.

6. The light module of claim 5, wherein the two or more LED light sources of the secondary light source are positioned in one plane with the LED light source of the primary light source.

7. The LED light module of claim 1, characterized in that the LED light source of the primary light source is controllable separately from the at least one additional LED light source of the secondary light source.

8. The LED light module of claim 1, further including a horizontal plane that runs through the LED light source of the primary light source, characterized in that when the LED light module is in an installed state in a vehicle headlight, the secondary light source has n LED light sources positioned vertically below the horizontal plane and m LED light sources positioned vertically above the horizontal plane, wherein $m<n$.

9. The LED light module of claim 8, wherein $m=0$.

10. The LED light module of claim 8, further including a vertical plane that runs through the optical axis, characterized in that the LED light sources are arranged above or below the horizontal plane and symmetrically in a horizontal direction relative to the vertical plane.

11. The LED light module of claim 8, characterized in that the at least one additional LED light source of the secondary light source is disposed laterally adjacent to the LED light source of the primary light source.

12. The LED light module of claim 1, characterized in that dimensions of the unaltering aperture and a position of the LED light source are selected in such a way that all light rays that are emitted by the LED light source that lie within an aperture angle of the projection lens can pass through the unaltering aperture.

13. The LED light module of claim 1, characterized in that dimensions of the unaltering aperture and a position of the at least one additional LED light source of the secondary light source are selected such that the light rays emitted by the at least one additional LED light source of the secondary light source are emitted only into regions of the diffusion disk that have no aperture.

14. The LED light module of claim 13, characterized in that the dimensions of the unaltering aperture and the position of the at least one additional LED light source of the secondary light source are selected such that the light rays emitted by the secondary light source form the secondary light source up to an edge of the unaltering aperture.

15. The light module of claim 1, wherein the primary light source is an infrared light source.

16. The light module of claim 1, wherein an edge of the unaltering aperture tapers downwardly in the direction of the LED light source.

17. The light module of claim 16, wherein the edge is trapezoidal.

18. An LED light module for a vehicle headlight, the LED light module comprising: a projection lens; an LED light source that emits light; and a diffusion disk disposed between the LED light source and the projection lens as viewed in a light exit direction, the diffusion disk having at least one unaltering aperture for direct passage of at least one component of the light emitted by the LED light source; wherein a direct component of the light emitted by the LED light source emerges through the unaltering aperture and is projected through the projection lens so as to generate a lighting function in a region in front of the vehicle headlight; wherein the at least one unaltering aperture is unobstructed so that the direct component of light emitted by the LED light source through the at least one unaltering aperture unobstructed and without passing through a lens.

19. The light module of claim 18, wherein the LED light source is an infrared light source.

* * * * *